(12) United States Patent
Shimizu et al.

(10) Patent No.: US 12,451,810 B2
(45) Date of Patent: Oct. 21, 2025

(54) POWER SUPPLY DEVICE

(71) Applicant: ADVANTEST CORPORATION, Tokyo (JP)

(72) Inventors: Takahiko Shimizu, Tokyo (JP); Shoichiro Imai, Tokyo (JP)

(73) Assignee: ADVANTEST CORPORATION, Tokyo (JP)

( * ) Notice: Subject to any disclaimer, the term of this patent is extended or adjusted under 35 U.S.C. 154(b) by 251 days.

(21) Appl. No.: 18/312,009

(22) Filed: May 4, 2023

(65) Prior Publication Data

US 2023/0275515 A1     Aug. 31, 2023

Related U.S. Application Data (63) Continuation of application No. PCT/JP2021/038780, filed on Oct. 20, 2021.

(30) Foreign Application Priority Data

Nov. 30, 2020    (JP) ................................ 2020-198414

(51) Int. Cl.
     *H02M 1/00*      (2007.01)
     *H02M 3/335*     (2006.01)

(52) U.S. Cl.
     CPC ..... *H02M 3/33523* (2013.01); *H02M 1/0009* (2021.05); *H02M 1/0019* (2021.05); *H02M 3/33515* (2013.01)

(58) Field of Classification Search
     CPC ..... G05F 1/00; G05F 1/10; G05F 1/12; G05F 1/46; G05F 1/455; G05F 1/45;
(Continued)

(56) References Cited

U.S. PATENT DOCUMENTS

| | | | |
|---|---|---|---|
| 9,748,830 B1 * | 8/2017 | Soleño | H02J 1/102 |
| 11,081,958 B2 * | 8/2021 | Liang | H02M 3/156 |

(Continued)

FOREIGN PATENT DOCUMENTS

| | | |
|---|---|---|
| JP | S62221872 A | 9/1987 |
| JP | H01129718 A | 5/1989 |

(Continued)

OTHER PUBLICATIONS

International Search Report for International Application No. PCT/JP2021/038780; Mailing Date, Jan. 11, 2022.
(Continued)

*Primary Examiner* — Sean Kayes
*Assistant Examiner* — Nusrat Quddus
(74) *Attorney, Agent, or Firm* — CANTOR COLBURN LLP (57) ABSTRACT

A power supply apparatus includes multiple channels of power supply units coupled in a stack connection. Each power supply unit includes an output stage configured to generate an output voltage across a positive output and a negative output according to a control signal. A current detector of a master channel generates a current detection signal that indicates an output current of the output stage. A feedback controller generates the control signal such that the current detection signal approaches a target value.

11 Claims, 9 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H05B 39/048; B23K 11/24; H04B 2215/069; G01R 19/165; G01R 19/16504; G01R 19/16509; G01R 19/16514; G01R 19/16519; G01R 19/16523; G01R 19/16528; G01R 19/16533; G01R 19/16538; G01R 19/16542; G01R 19/16547; G01R 19/16552; G01R 19/16557; G01R 19/16561; G01R 19/16566; G01R 19/16571; G01R 19/16576; G01R 19/1658; G01R 19/16585; G01R 19/1659; G01R 19/16595; G01R 19/17
See application file for complete search history.

(56) References Cited

U.S. PATENT DOCUMENTS

| | | | | |
|---|---|---|---|---|
| 11,888,399 | B2* | 1/2024 | Itou | H02M 1/0025 |
| 2006/0273770 | A1* | 12/2006 | Siri | H02M 3/33515 |
| | | | | 323/272 |
| 2008/0238390 | A1* | 10/2008 | Trivedi | H02M 3/1584 |
| | | | | 323/283 |
| 2009/0237133 | A1* | 9/2009 | Yang | H02M 3/1584 |
| | | | | 327/161 |
| 2010/0097041 | A1* | 4/2010 | Ayukawa | H02M 1/4225 |
| | | | | 323/272 |
| 2011/0043177 | A1* | 2/2011 | Chen | H02M 1/4225 |
| | | | | 323/283 |
| 2012/0169311 | A1* | 7/2012 | Malmberg | H02J 1/102 |
| | | | | 323/272 |
| 2014/0375288 | A1* | 12/2014 | Nora | H02J 1/102 |
| | | | | 323/272 |
| 2015/0188406 | A1* | 7/2015 | Nishi | H02M 3/156 |
| | | | | 323/217 |
| 2016/0211745 | A1* | 7/2016 | Hang | H02M 3/1584 |
| 2016/0218618 | A1* | 7/2016 | Yin | H02M 3/33576 |
| 2019/0037723 | A1* | 1/2019 | Vatariu | H05K 7/1447 |
| 2019/0384337 | A1* | 12/2019 | Lu | G05F 1/575 |
| 2020/0295563 | A1 | 9/2020 | Lu et al. | |
| 2020/0343723 | A1* | 10/2020 | Li | H02M 3/33561 |
| 2021/0231728 | A1* | 7/2021 | Yawata | H02J 4/00 |
| 2021/0257915 | A1* | 8/2021 | Ishii | H02M 1/092 |
| 2021/0391752 | A1* | 12/2021 | Guedon | H02J 50/40 |
| 2022/0263400 | A1* | 8/2022 | Yamaguchi | H02M 3/158 |
| 2023/0113610 | A1* | 4/2023 | Chen | H02M 3/158 |
| 2023/0114503 | A1* | 4/2023 | Chen | H02M 1/0025 |
| | | | | 323/259 |
| 2023/0336082 | A1* | 10/2023 | Dai | H02M 1/327 |
| 2023/0353055 | A1* | 11/2023 | Shimizu | H02M 3/157 |
| 2024/0072672 | A1* | 2/2024 | Chen | H02M 3/1586 |
| 2025/0167547 | A1* | 5/2025 | Lin | H02J 1/106 |

FOREIGN PATENT DOCUMENTS

| | | |
|---|---|---|
| JP | H08289541 A | 11/1996 |
| JP | H09191564 A | 7/1997 |
| JP | 2002165441 A | 6/2002 |
| JP | 2013138557 A | 7/2013 |
| JP | 2013535949 A | 9/2013 |
| JP | 2014147196 A | 8/2014 |
| JP | 2015065738 A | 4/2015 |
| JP | 2016208742 A | 12/2016 |
| JP | 2017127195 A | 7/2017 |
| TW | 200627771 A | 8/2006 |

OTHER PUBLICATIONS

PCT International Preliminary Report on Patentability issued on May 30, 2023, with Written Opinion of the International Searching Authority for corresponding International Application No. PCT/JP2021/038780; Mailing Date, Jan. 11, 2022.
TW Notice of Examination Opinion for corresponding TW Application No. 110139586; Mailing Date, Jul. 18, 2022.
JPO Notification of Reason(s) for Refusal for corresponding JP Application No. 2020-198414; Issued Sep. 10, 1 2024.
KR IPO Request for the Submission of an Opinion for corresponding KR Application No. 10-2023-7008398; Issued Feb. 21, 2025.

* cited by examiner

POWER SUPPLY DEVICE

CROSS REFERENCES TO RELATED APPLICATIONS

This application is a continuation under 35 U.S.C. § 120 of PCT/JP2021/038780, filed Oct. 20, 2021, which is incorporated herein by reference, and which claimed priority to Japanese Application No. 2020-198414, filed Nov. 30, 2020. The present application likewise claims priority under 35 U.S.C. § 119 to Japanese Application No. 2020-198414, filed Nov. 30, 2020, the entire content of which is also incorporated herein by reference.

BACKGROUND

1. Technical Field

The present disclosure relates to a power supply apparatus configured to supply a power supply voltage or power supply current to a device.

2. Description of the Related Art

In recent years, in order to reduce power consumption, power devices such as silicon carbide (SiC) Field-Effect Transistors (FETs), gallium nitride (GaN) High Electron Mobility Transistors (HEMTs), etc., configured to provide high-speed high-voltage switching so as to enable high-efficiency power conversion, are in active research and development. In addition to such a demand, there is an increased demand for a test of a device that applies a high voltage. Also, there is an increased demand for reducing test time. Such a device test requires high-voltage, high-precision DC voltage application of 1000 V, and depending on the device, such a device test requires high-voltage, high-precision DC voltage application of 2000 V.

In a case in which the maximum output voltage of the power supply apparatus for such a test apparatus is lower than a high voltage to be supplied to a load, there is a need to couple multiple channels of power supply apparatuses (which will be referred to as "power supply units" hereafter) in series (which will be referred to as a "stack connection" hereafter).

Figure 1:
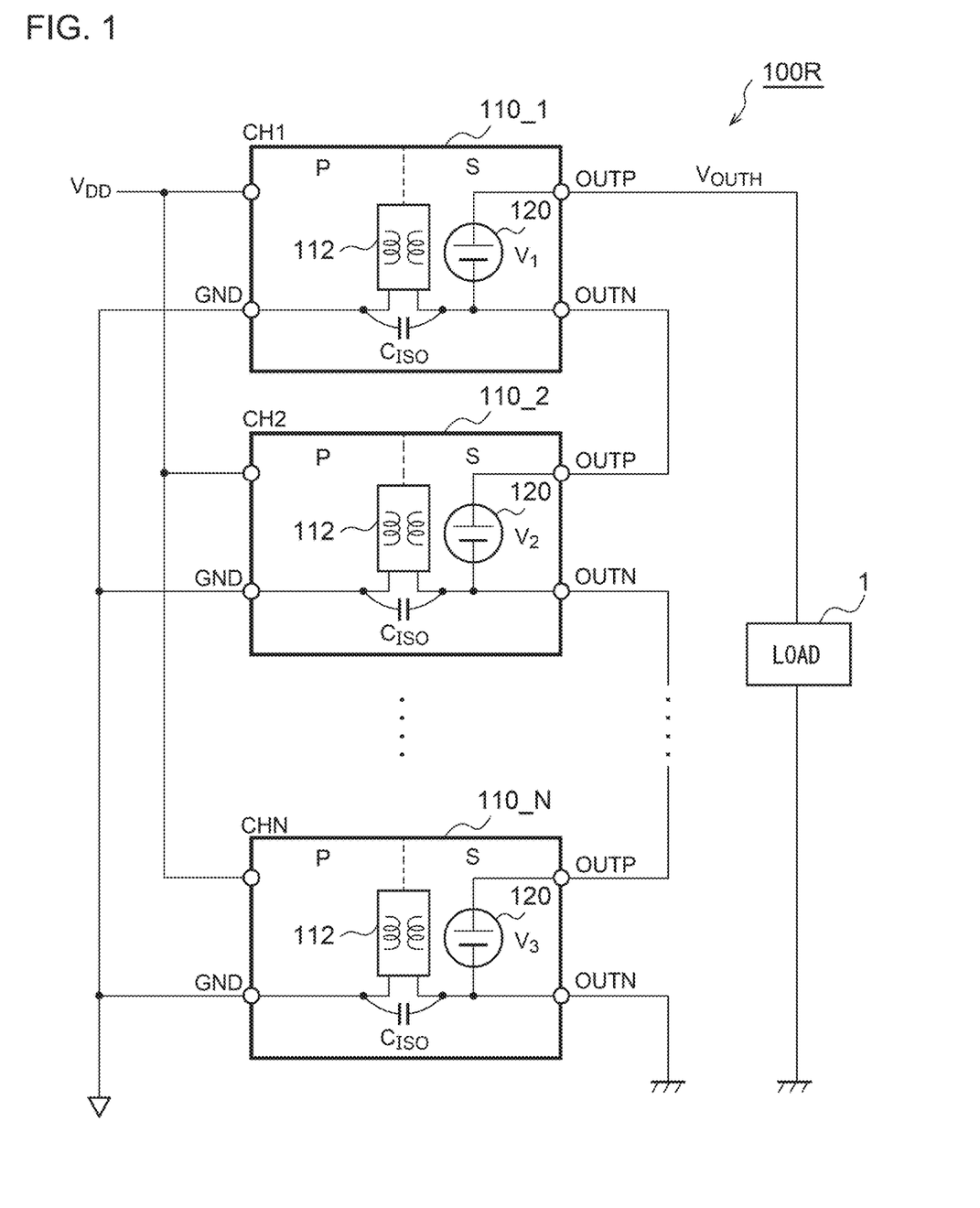
FIG. 1 is a block diagram of a high-voltage power supply.

FIG. 1 is a block diagram of a high-voltage power supply 100R. Referring to FIG. 1, the high-voltage power supply 100R includes multiple channels CH1 through CHN of power supply units 110_1 through 110_N coupled in a stack connection. Each channel of the power supply units 110 includes a primary side P and a secondary side S. The primary side P and the secondary side S are isolated via an isolation barrier 112 such as a transformer, capacitor, or the like. The ground terminals GND of the primary sides P of the multiple power supply units 110_1 through 110_N are coupled to each other so as to form a common GND.

The secondary side S of each power supply unit 110 is provided with a positive output OUTP and a negative output OUTN, and an output stage 120 arranged between the positive output OUTP and the negative output OUTN.

Typically, a power supply apparatus is configured to be switchable between a voltage application mode (constant voltage mode) in which a constant voltage is supplied to a load and a current application mode (constant current mode) in which a constant current is supplied to a load. As shown in FIG. 1, description will be made regarding a case in which the high-voltage power supply 100R including multiple power supply units 100 coupled in a stack connection is operated in the current application mode. For ease of description, description will be made below assuming that the N=2 stages of power supply units 110_1 and 110_2 are stacked.

Comparison Technique 1

In a comparison technique 1, all the power supply units 110_1 and 110_2 coupled in a stack connection are operated in the current application mode in which each power supply unit is operated with an equal target value (setting value) Iref. In this case, the same current Iref flows through all of the channels. Ideally, the same amount of current is detected for all of the channels. However, in actuality, due to detection error, the currents Iref+$\Delta I_1$ and Iref+$\Delta I_2$ could be detected as deviating from the target value Iref. In this case, the current $I_{OUT}$ supplied from the high-voltage power supply 100R to a load is represented by $I_{OUT}$=Iref−($\Delta I_1$+$\Delta I_2$)/2. That is to say, the output current $I_{OUT}$ is an amount of current obtained by subtracting an average value of the detection errors $\Delta I_1$ and $\Delta I_2$ of the respective channels from the target value Iref.

Figure 2A:
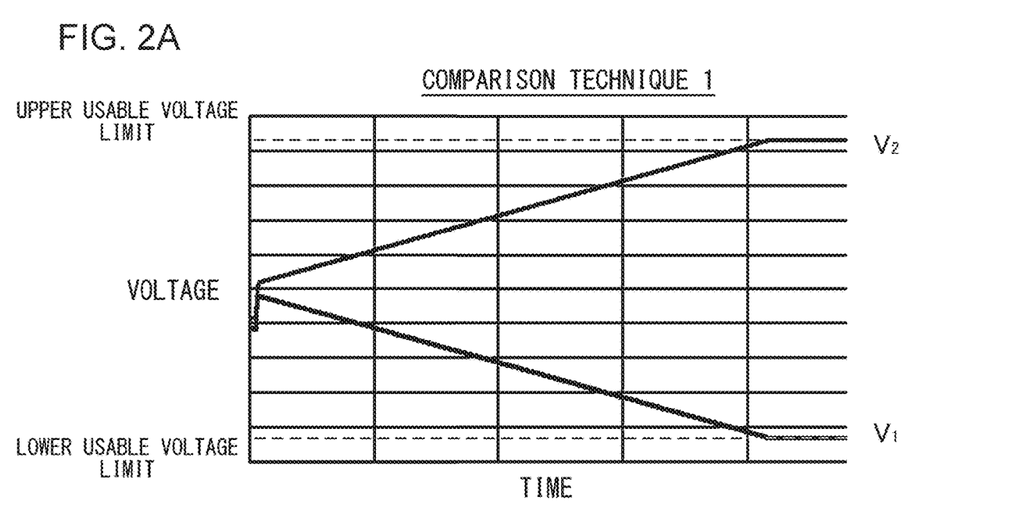
FIG. 2A is a diagram showing a voltage waveform of a high-voltage power supply according to a comparison technique 1 when it is started up.

FIG. 2A is a diagram showing a voltage waveform of a high-voltage power supply according to the comparison technique 1 when it is started up. The state of the power supply unit of each channel converges to one of the following two states due to the detection errors $\Delta I_1$ and $\Delta I_2$ of the current.

(1) The output voltage falls such that it reaches the lower limit of the usable voltage (which will be referred to as the "lower useable voltage limit").

(2) The output voltage rises such that it reaches the upper limit of the usable voltage (which will be referred to as "upper useable voltage limit").

FIG. 2A shows a situation in which the voltage $V_1$ of the first channel falls to the lower useable voltage limit, and the voltage $V_2$ of the second channel rises to the useable upper limit voltage.

That is to say, although two stages of power supply units are coupled in a stack connection in order to generate high voltage, such an arrangement involves a channel that operates at a lower useable voltage limit. As a result, such an arrangement is not able to generate a desired high voltage. That is to say, in actuality, the comparison technique 1 cannot be employed.

Comparison Technique 2

In a comparison technique 2, one from among the multiple power supply units 110 is operated in the current application mode, and the remaining power supply units 110 are operated in the voltage application mode. In this example, the power supply unit 110_1 is operated in the current application mode, and the power supply unit 110_2 is operated in the voltage application mode. The voltage setting value (target value) Vref for the power supply unit 110_2 to be operated in the voltage application mode is appropriately determined giving consideration to the assumed load voltage $V_{OUTH}$.

Figure 2B:
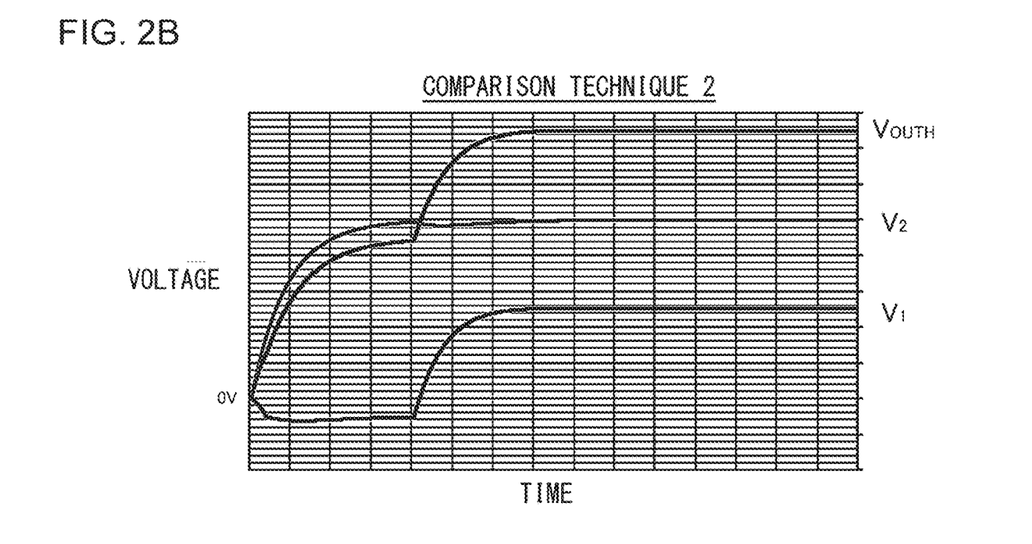
FIG. 2B is a diagram showing a voltage waveform of a high-voltage power supply according to a comparison technique 2 when it is started up.

FIG. 2B is a diagram showing a voltage waveform of a high-voltage power supply according to the comparison technique 2 when it is started up. First, the power supply unit 110_2 is started up in the voltage application mode as an initial operation. After the output voltage $V_2$ reaches the voltage setting value Vref, the power supply unit 110_1 starts the application of current in the current application mode.

In the comparison technique 2, the voltage setting value Vref of the channel to be operated in the voltage application mode must be set according to the load. For example, the voltage setting value Vref must be set to a high value for a high-voltage load. However, in a case in which the load is changed to a different low-voltage load, this can involve a problem of overvoltage applied to the load. That is to say, the comparison technique 2 has a problem of a lack of versatility.

Furthermore, such an arrangement requires the voltage application channel and the current application channel to be operated in sequence, leading to two-stage settling. Accordingly, this is not capable of providing the same startup waveform as that provided by a single-channel arrangement. In addition, this leads to increased settling time.

SUMMARY

An embodiment of the present disclosure has been made in view of such a situation.

One embodiment of the present disclosure relates to a power supply apparatus. The power supply apparatus includes multiple channels of power supply units coupled in a stack connection. The power supply units of the multiple channels each include: a positive output and a negative output; and an output stage configured to generate an output voltage across the positive output and the negative output according to a control signal. The power supply unit of a master channel that is one from among the multiple channels further includes: a current detector configured to generate a current detection signal that indicates an output current of the output stage; and a feedback controller configured to generate the control signal such that the current detection signal approaches a target value. The output stages of all the channels operate based on the control signal generated by the feedback controller of the master channel.

Another embodiment of the present disclosure relates to a power supply unit. The power supply unit is configured to allow a power supply apparatus to be formed by stacking multiple power supply units. The power supply units each include: a positive output and a negative output; an output stage configured to generate an output voltage across the positive output and the negative output according to a control signal; a current detector structured such that, when the power supply unit is set to a master channel, the current detector is activated so as to generate a current detection signal that indicates an output current of the output stage; a feedback controller structured such that, when the power supply unit is set to the master channel, the feedback controller is activated so as to generate the control signal such that the current detection signal approaches a target value; and an interface circuit structured such that, when the power supply unit is set to the master channel, the interface circuit transmits the control signal to the other channels, and such that, when the power supply unit is set to a slave channel, the interface circuit receives the control signal from the master channel.

It should be noted that any combination of the components described above or any component or any manifestation of the present disclosure may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Outline of Embodiments

Description will be made regarding the outline of several exemplary embodiments of the present disclosure. The outline is a simplified explanation regarding several concepts of one or multiple embodiments as a prelude to the detailed description described later in order to provide a basic understanding of the embodiments. That is to say, the outline described below is by no means intended to restrict the scope of the present invention and the present disclosure. Furthermore, the outline described below is by no means a comprehensive outline of all the possible embodiments. That is to say, the outline described below by no means restricts essential components of the embodiments. For convenience, in some cases, "one embodiment" as used in the present specification represents a single or multiple embodiments (examples and modifications) disclosed in the present specification.

The power supply apparatus according to one embodiment includes multiple channels of power supply units coupled in a stack connection. The power supply units of the multiple channels each include: a positive output and a negative output; and an output stage configured to generate an output voltage across the positive output and the negative output according to a control signal. The power supply unit of a master channel that is one from among the multiple channels further includes: a current detector configured to generate a current detection signal that indicates an output current of the output stage; and a feedback controller configured to generate the control signal such that the current detection signal approaches a target value. The output stages of all the channels operate based on the control signal generated by the feedback controller of the master channel.

With this configuration, current is measured in only the master channel, which is one from among the multiple channels, so as to provide feedback control for current application. With such an arrangement in which the control signal obtained in the master channel is transmitted to the other slave channels, this provides the same operation as that provided by a single-channel power supply apparatus, thereby providing improved settling operation.

In one embodiment, the multiple channels of power supply units may each further include a voltage detector configured to generate a voltage detection signal that indicates an output voltage of the output stage. The power supply unit of the master channel may further include a voltage feedback signal generating unit configured to receive the voltage detection signal from the power supply units of slave channels, which are the remaining channels of the multiple channels, and to generate a voltage feedback signal based on the voltage detection signals of all the channels. When the voltage feedback signal exceeds a predetermined limit value, the feedback controller of the master channel may generate the control signal such that the voltage feedback signal approaches the limit value. This provides a voltage clamp operation such that the total of the voltages of all the channels does not exceed a predetermined upper limit.

Also, the voltage feedback signal may be an average value of the voltage detection signals of all the channels.

In one embodiment, the power supply unit of the master channel may further include a voltage detector configured to generate a voltage detection signal that indicates an output voltage of the output stage. When the voltage detection signal exceeds a predetermined limit value, the feedback controller may generate the control signal such that the voltage detection signal approaches the limit value. In this case, such an arrangement provides a voltage clamp operation for all the channels based on the state of the master channel.

In one embodiment, the power supply units of the multiple channels may have the same configuration each including the feedback controller and the current detector. Each power supply unit may be selectively switchable between a master mode and a slave mode. When a power supply unit is set to the master mode, the feedback controller may be enabled. When a power supply unit is set to the slave mode, the feedback controller may be disabled. It should be noted that the "disabled state of a circuit block" is not limited to a state in which the circuit block is not operated, but also includes a disabled state of the circuit block in which the circuit block operates but the output thereof is blocked or masked.

By preparing multiple power supply units having the same configuration and rearranging the connection relation so as to appropriately set the modes, this allows the number of loads or the like to be changed. For example, in a case in which the number of the power supply units is N, by stacking the N power supply units such that one power supply unit is set to the master mode and the remaining power supply units are set to the slave mode, such an arrangement is capable of supplying electric power to a single load. In contrast, by employing all the N power supply units independently as the master mode, this is capable of supplying electric power to N loads.

Also, the master channel may be an uppermost-stage channel from among the multiple channels.

A power supply unit according to one embodiment is configured to allow a power supply apparatus to be formed by stacking multiple power supply units. The power supply units each include: a positive output and a negative output; an output stage configured to generate an output voltage across the positive output and the negative output according to a control signal; a current detector structured such that, when the power supply unit is set to a master channel, the current detector is activated so as to generate a current detection signal that indicates an output current of the output stage; a feedback controller structured such that, when the power supply unit is set to the master channel, the feedback controller is activated so as to generate the control signal such that the current detection signal approaches a target value; and an interface circuit structured such that, when the power supply unit is set to the master channel, the interface circuit transmits the control signal to the other channels, and such that, when the power supply unit is set to a slave channel, the interface circuit receives the control signal from the master channel.

With this configuration, in a case in which multiple channels are coupled in a stack connection, current is measured in only the master channel so as to provide feedback control for current application. With this, by transmitting the control signal obtained in the master channel to the other slave channels, this provides the same operation as that provided by a single-channel power supply apparatus, thereby providing improved settling operation. Furthermore, by preparing multiple power supply units having the same configuration and rearranging the connection relation so as to appropriately set the modes, this allows the number of loads to be changed.

In one embodiment, the power supply unit may further include a voltage detector configured to generate a voltage detection signal that indicates an output voltage of the output stage. When the power supply unit is set to the master channel, and when the voltage detection signal exceeds a predetermined limit value, the feedback controller may generate the control signal such that the voltage detection signal approaches the limit value.

In one embodiment, an arrangement may be made in which multiple power supply units are coupled in a stack connection.

EMBODIMENTS

Description will be made below regarding preferred embodiments with reference to the drawings. The same or similar components, members, and processes are denoted by the same reference numerals, and redundant description thereof will be omitted as appropriate. The embodiments have been described for exemplary purposes only and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electrical connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C, via another member that does not substantially affect the electrical connection between them, or that does not damage the functions or effects of the connection between them, in addition to a state in which they are directly coupled.

Figure 3:
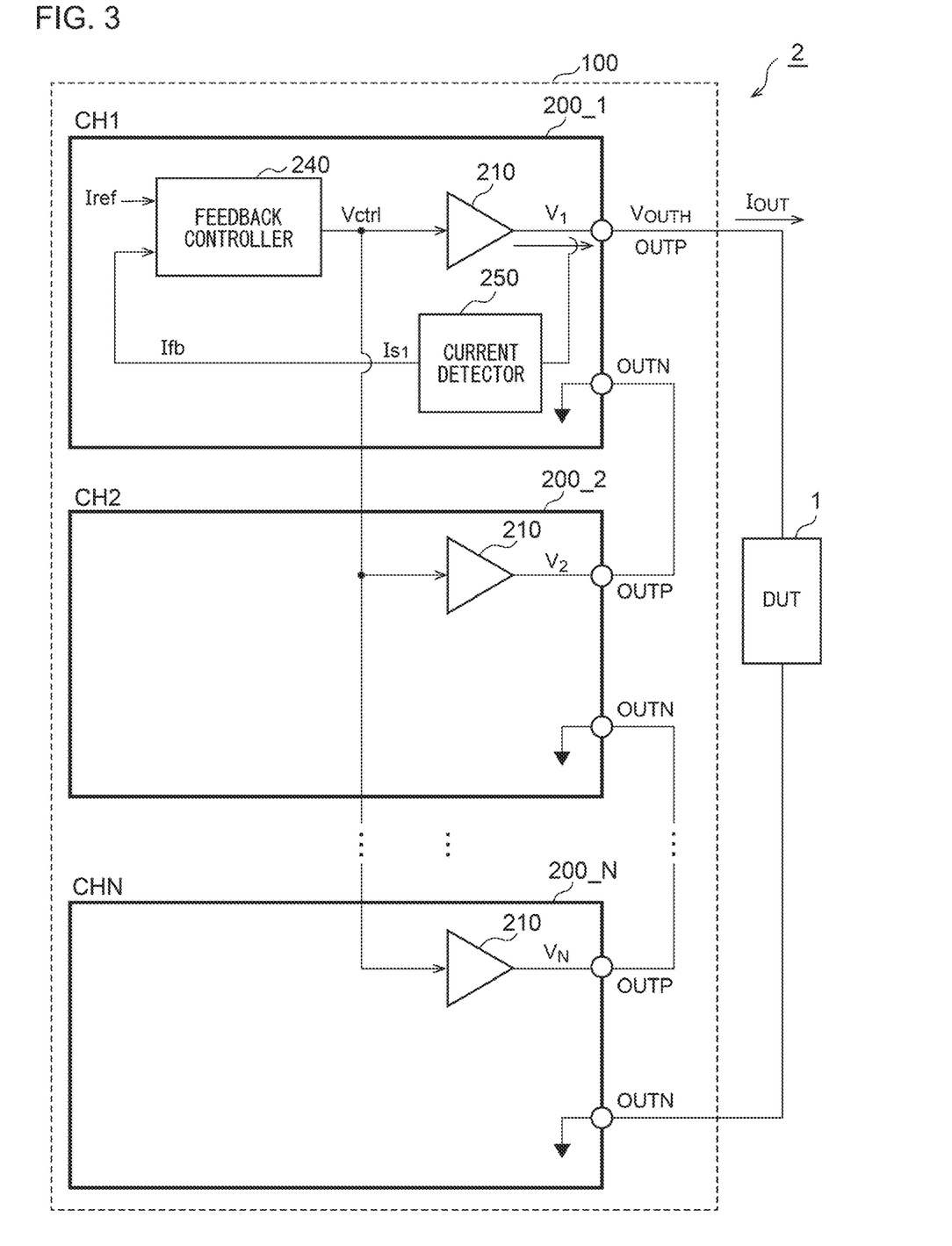
FIG. 3 is a block diagram showing a test apparatus provided with a power supply apparatus according to an embodiment.

FIG. 3 is a block diagram showing a test apparatus 2 provided with a power supply apparatus 100 according to an embodiment. The test apparatus 2 applies a test signal such as a voltage signal, current signal, or the like, to a device under test (DUT) 1, and measures a response of the DUT 1. The kind of the DUT 1 is not restricted in particular. Specifically, devices such as high-voltage transistors, power modules, etc., that require the application of a high voltage exceeding 1000 V, or circuits and circuit systems including such a device, are preferably selected as a test target of the test apparatus 2.

The test apparatus 2 is provided with the power supply apparatus 100 configured to supply a power supply signal to the DUT 1. In the present embodiment, the power supply signal is generated as a current signal $I_{OUT}$ stabilized to a predetermined amount of current (target value). It should be noted that FIG. 3 shows an arrangement in which the current signal $I_{OUT}$ is directly supplied to the DUT 1. However, the present invention is not restricted to such an arrangement. Also, the current signal $I_{OUT}$ may be supplied to a peripheral circuit of the DUT 1, a circuit configured to drive the DUT 1, or a circuit configured as an interface with the DUT 1.

The test apparatus 2 includes a voltage sensor or a current sensor, a signal generator or a driver, a comparator, an A/D converter, a D/A converter, etc., in addition to the power supply apparatus 100. Such components are determined according to the kind of the DUT 1 or the test items and are not shown in FIG. 3.

The power supply apparatus 100 is provided with a plurality of N channels (CH1 through CHN) of power supply units 200_1 through 200_N coupled in a stack connection. Each power supply unit 200 includes a positive output OUTP and a negative output OUTN. In the same manner as the power supply unit 110 shown in FIG. 1, each power supply unit 200 includes a primary side and a secondary side that are isolated from each other. However, FIG. 3 shows only the configuration of the secondary side. The negative output OUTN provides a reference electric potential (ground) of the secondary side.

The negative output OUTN of the power supply unit 110_$i$ of the i-th (1≤i≤N−1) channel is coupled to the positive output OUTP of the power supply unit 110_($i$+1) of the ($i$+1)-th channel. The positive output OUTP of the power supply unit 110_1 of the first channel is coupled to a load 1. The negative output OUTN of the power supply unit 110 of the N-th channel is grounded.

The power supply units 200 of the multiple channels are each provided with an output stage 210. The output stage 210 of the i-th (1≤i≤N) power supply unit 200_$i$ generates an output voltage $V_i$ across the positive output OUTP and the negative output OUTN according to a control signal Vctrl.

In the present embodiment, from among the plurality of N channels CH1 through CHN, one is set as a master channel, and the other channels are set as slave channels. FIG. 3 shows an arrangement in which the first channel CH1 is set as the master channel and the second through N-th channels CH2 through CHN are set as slave channels. However, the present invention is not restricted to such an arrangement.

The power supply unit 200_1 set as the master channel includes a current detector 250 and a feedback controller 240 in addition to the output stage 210.

The current detector 250 generates a current detection signal $Is_1$ that indicates the output current $I_{OUT}$ of the output stage 210. The current detection signal $Is_1$ is input to the feedback controller 240 as the feedback signal Ifb.

The feedback controller 240 receives the input of a target value Iref of the output current $I_{OUT}$. The feedback controller 240 feedback-controls the signal level (magnitude) of the control signal Vctrl such that the feedback signal Ifb approaches the target value Iref. The control signal Vctrl generated by the feedback controller 240 is supplied to the output stage 210 of the master channel.

Such an arrangement is configured to enable signal transmission and reception between the master channel and the slave channels. Specifically, the control signal Vctrl can be transmitted from the power supply unit 200_1 of the master channel to the power supply units 200_2 through 200_N of the slave channels.

The output stages 210 of the slave channels CH2 through CHN each operate based on the control signal Vctrl generated by the feedback controller 240 of the master channel CH1.

The above is the configuration of the power supply apparatus 100.

Figure 4:
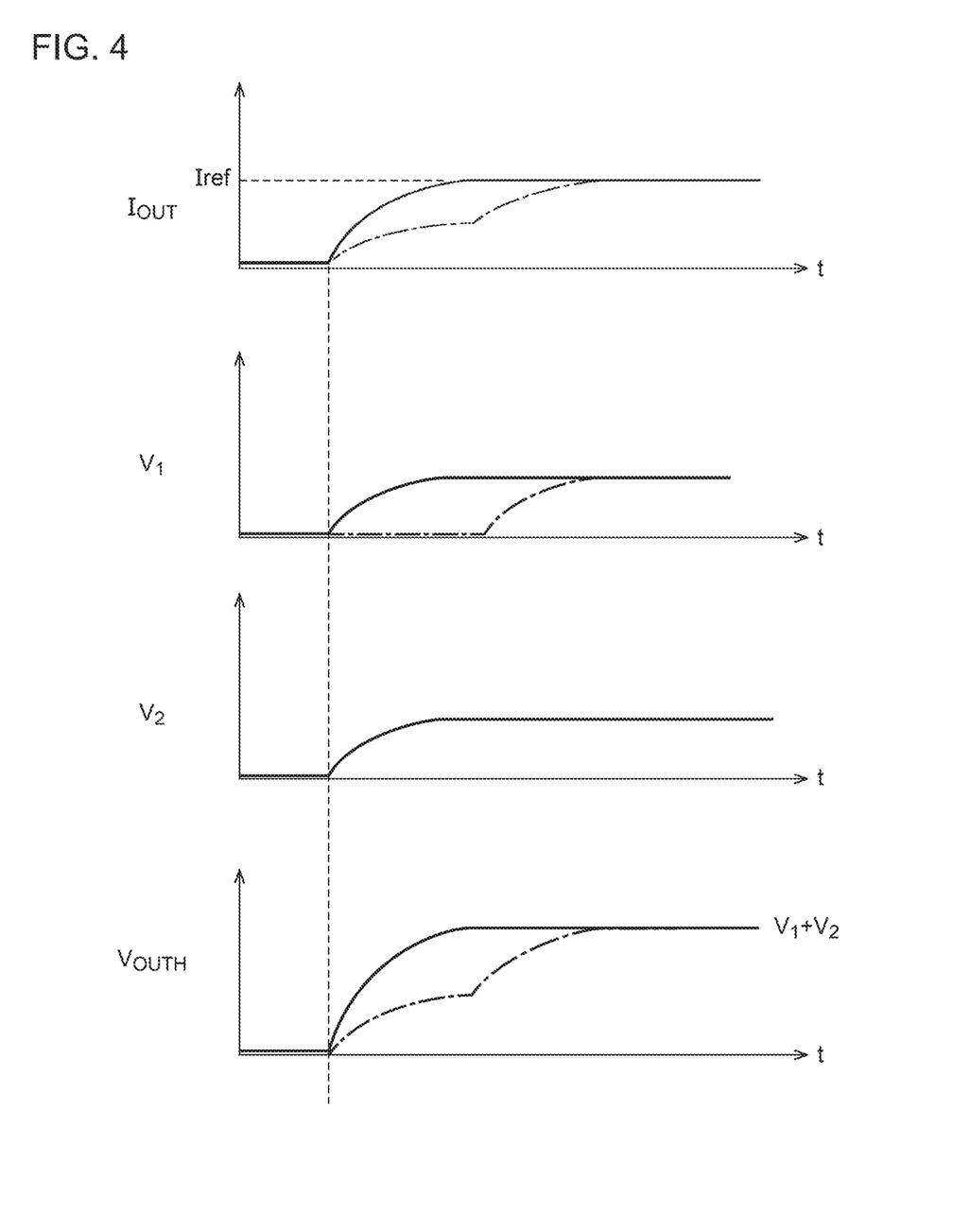
FIG. 4 is a diagram showing voltage waveforms and current waveforms of the power supply apparatus shown in FIG. 3 when it is started up.

FIG. 4 is a diagram showing a voltage waveform and a current waveform of the power supply apparatus 100 shown in FIG. 3 when it is started up. Here, description will be made regarding a configuration of N=2 channels. For comparison, the waveforms provided by the comparison technique 2 are indicated by lines of alternately long and short dashes.

As indicated by the solid lines, with the present embodiment, current measurement is performed in only the master channel, which is one from among the multiple channels, and feedback control is applied for current application. With this arrangement in which the control signal Vctrl obtained in the master channel is transmitted to the other slave channels, this provides the same operation as that provided by a single-channel power supply apparatus. This provides improved settling operation as compared with the comparison technique 2.

The present disclosure encompasses various kinds of apparatuses and methods that can be regarded as a block configuration or a circuit configuration shown in FIG. 3, or otherwise that can be derived from the aforementioned description. That is to say, the present invention is not restricted to a specific configuration. More specific description will be made below regarding example configurations and examples for clarification and ease of understanding of the essence of the present invention and the operation thereof. That is to say, the following description will by no means be intended to restrict the technical scope of the present invention.

Example 1

Figure 5:
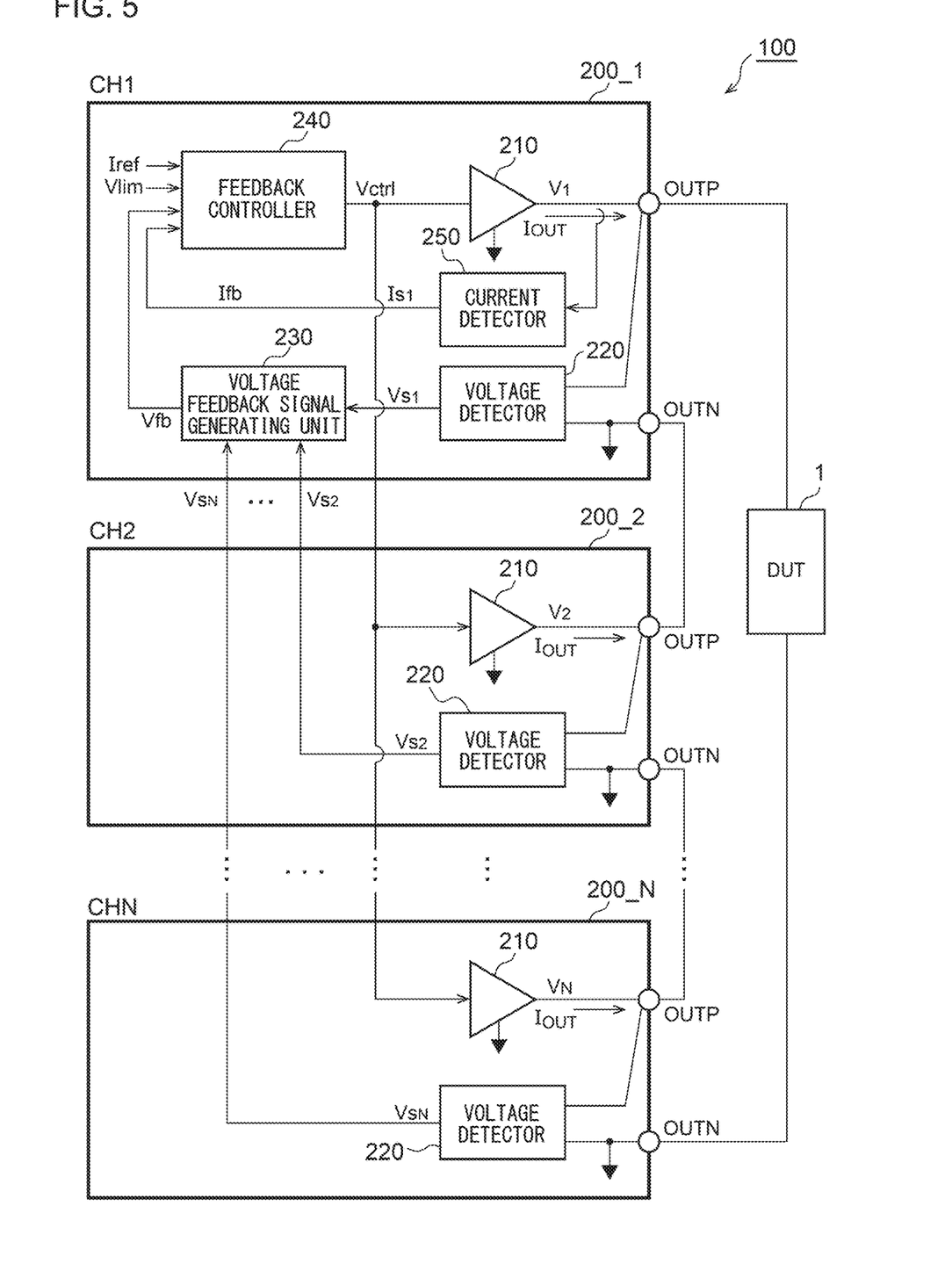
FIG. 5 is a block diagram of a power supply apparatus according to an example 1

FIG. 5 is a block diagram of a power supply apparatus 100 according to an example 1. The power supply apparatus 100 has a voltage clamp function. In addition, the power supply units 200_1 through 200_N of the multiple channels each include a voltage detector 220. The voltage detector 220 of a given channel CHi generates the voltage detection signal $Vs_i$ that indicates the output voltage $V_i$ of the output stage 210 of the same channel CHi. The voltage detection signals $Vs_2$ through $Vs_N$ generated by the slave channels CH2 through CHN are transmitted to the master channel.

The power supply unit 200_1 of the master channel CH1 includes a voltage feedback signal generating unit 230. The voltage feedback signal generating unit 230 receives the voltage detection signals $Vs_2$ through $Vs_N$ from the power supply units 200_2 through 200_N of the slave channels and generates a voltage feedback signal Vfb based on the voltage detection signals $Vs_1$ through $Vs_N$ of all the channels CH1 through CHN. The voltage feedback signal Vfb is supplied to the feedback controller 240. For example, the voltage feedback signal Vfb is a simple average of the voltage detection signals of all the channels and is represented by the following Expression.

$$Vfb = \Sigma_{i=1:N} V_i / N \quad (1)$$

In a state in which the voltage feedback signal Vfb is lower than a predetermined limit value Vlim, the feedback controller 240 of the master channel CH1 generates the control signal Vctrl such that the current feedback signal Ifb approaches the target value Iref (constant current control). Conversely, in a state in which the voltage feedback signal Vfb exceeds the limit value Vlim, the constant current conrol is disabled, and generates the control signal Vctrl such that the voltage feedback signal Vfb approaches the limit value Vlim (voltage clamp control).

In Expression (1), $\Sigma_{i=1:N} V_i$ represents the total of the generated voltages $V_1$ through $V_N$ of all the channels CH1 through CHN, i.e., the high voltage $V_{OUTH}$ supplied to the load. Accordingly, the voltage feedback signal Vfb in Expression (1) is represented by $Vfb = V_{OUTH}/N$. When the voltage clamp is enabled, the voltage feedback signal Vfb becomes equal to the limit value Vlim.

$$Vfb = V_{OUTH}/N = Vlim$$

Accordingly, the output voltage $V_{OUTH}$ of the power supply apparatus 100 can be clamped such that it does not exceed Vlim×N.

It should be noted that in a case in which there is variation in the power supply units 200_1 through 200_N of the multiple channels, a weighted average may be calculated using coefficients giving consideration to the variation.

Example 2

Figure 6:
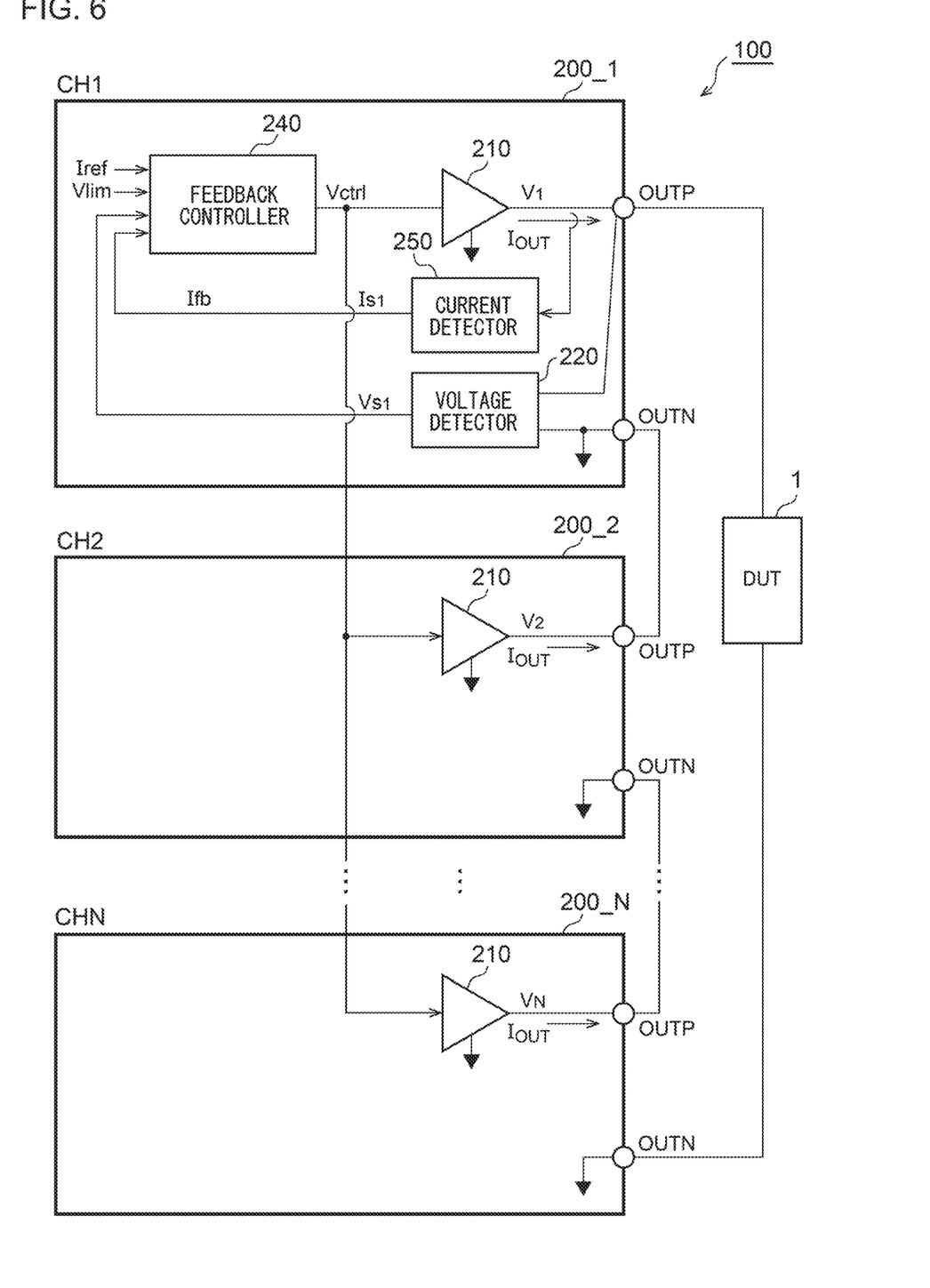
FIG. 6 is a block diagram of a power supply apparatus according to an example 2.

FIG. 6 is a block diagram of a power supply apparatus 100 according to an example 2. The power supply apparatus 100 has the voltage clamp function as in the example 1. The power supply unit 200_1 of the master channel is provided with a voltage detector 220. In a state in which a voltage detection signal $Vs_1$ generated by the voltage detector 220 is lower than a predetermined limit value Vlim, the feedback controller 240 generates the control signal Vctrl such that the current feedback signal Ifb approaches the target value Iref as described above (constant current control). Conversely, in a state in which the voltage detection signal $Vs_1$ exceeds the limit value Vlim, the constant current control is disabled, and the feedback controller 240 generates the control signal Vctrl such that the voltage detection signal $Vs_1$ approaches the limit value Vlim (voltage clamp control).

In a case in which the variations of the gains of the output stages 210 of all the channels can be ignored, the output voltages $V_1$ through $V_N$ of the output stages 210 of all the channels are equal to each other. Accordingly, the output voltage $V_{OUTH}$ can be approximated by $V_1 \times N$. When the voltage clamp is enabled, the voltage $V_1$ becomes equal to the limit value Vlim, thereby allowing the output voltage $V_{OUTH}$ to be clamped such that it does not exceed Vlim×N. The example 2 may be employed in a case in which the voltage clamp control does not require a high degree of precision.

Example 3

The power supply unit 200_1 of the master channel and the power supply units 200_2 through 200_N of the slave channels may be designed as separate configurations from the start. Also, as described below, the power supply unit 200 for the master channel and the power supply units 200 for the slave channels may be designed as the same configuration. Also, each power supply unit 200 may be configured to be capable of switching its operating mode between a mode in which it is operated as a master channel and a mode in which it is operated as a slave channel.

Figure 7:
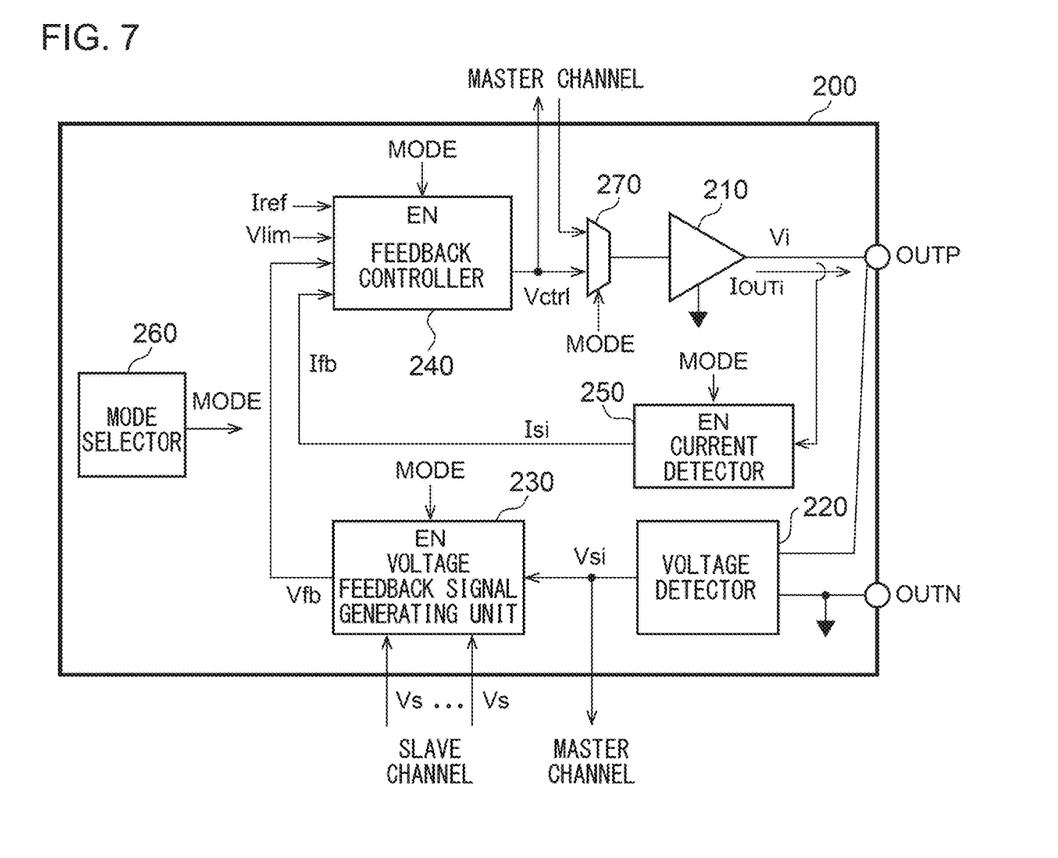
FIG. 7 is a block diagram of a power supply unit according to an example 3.

FIG. 7 is a block diagram of the power supply unit 200 according to an example 3. The power supply unit 200 can be used as both a master-channel power supply unit and as a slave-channel power supply unit. The power supply unit 200 includes a mode selector 260 and a multiplexer (switch) 270 in addition to the output stage 210, the voltage detector 220, the voltage feedback signal generating unit 230, the feedback controller 240, and the current detector 250.

The mode selector 260 generates a mode control signal MODE that indicates a master mode when the power supply unit 200 is used to be for the master channel and a slave mode when the power supply unit 200 is to be used for a slave channel. The mode control signal MODE is input to the voltage feedback signal generating unit 230, the feedback controller 240, and an enable terminal of the current detector 250. When the mode control signal MODE indicates the master mode, these blocks are enabled. When the mode control signal MODE indicates the slave mode, these blocks are disabled.

One input node of the multiplexer 270 is coupled to the output of the feedback controller 240 included in the same power supply unit 200. Furthermore, the other input node of the multiplexer 270 is configured to receive an input of the control signal Vctrl generated by a different power supply unit 200. When the mode control signal MODE indicates the master mode, the multiplexer 270 selects a control signal (internal control signal) Vctrl_int generated by the same power supply unit 200. When the mode control signal MODE indicates the slave mode, the multiplexer 270 selects an external control signal Vctrl_ext generated by a different power supply unit 200.

Furthermore, the power supply unit 200 is configured to be capable of outputting the control signal Vctrl_int and the voltage detection signal $Vs_i$ generated by an internal component thereof to an external circuit. Moreover, the power supply unit 200 is configured to be capable of receiving the control signal Vctrl_ext and the voltage detection signal $Vs_i$ generated by an external circuit.

Figure 8A:
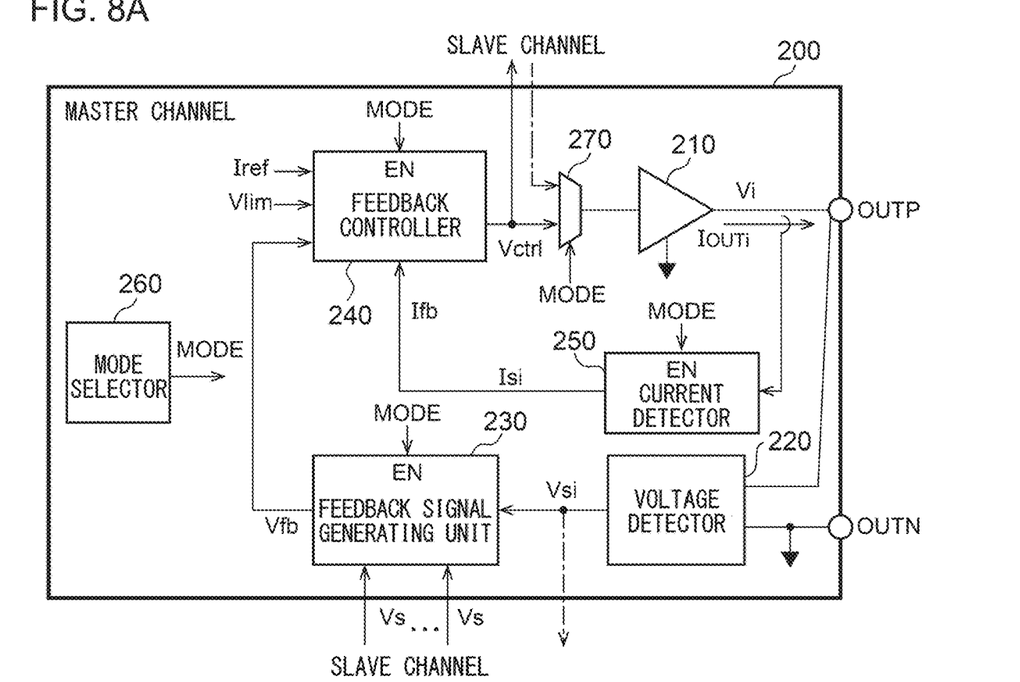
FIGS. 8A and 8B are diagrams showing the states of the power supply unit shown in FIG. 7 in a master mode and a slave mode, respectively.
Figure 8B:
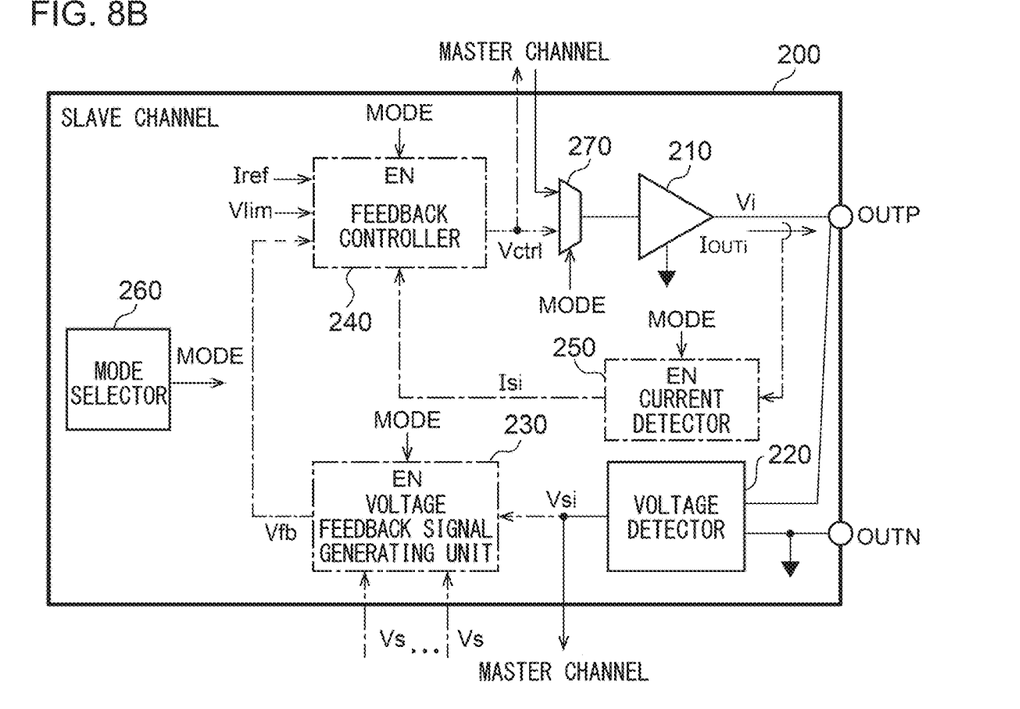

FIGS. 8A and 8B are diagrams showing a master-mode state and a slave-mode state of the power supply unit 200 shown in FIG. 7. In FIGS. 8A and 8B, disabled blocks and signal lines are indicated by lines of alternately long and short dashes.

Figure 9:
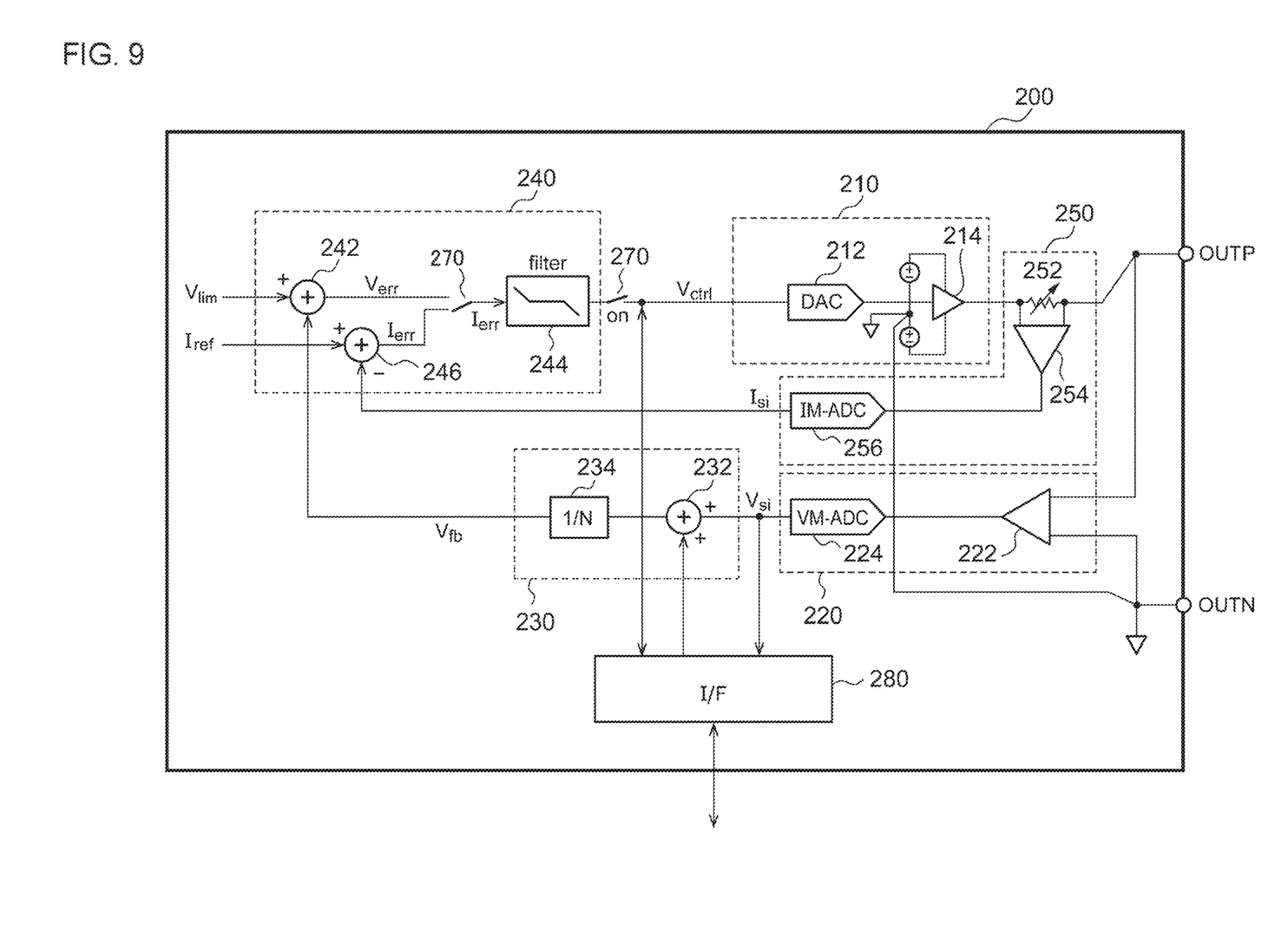
FIG. 9 is a block diagram showing a specific example configuration of a power supply unit.

FIG. 9 is a block diagram showing a specific example configuration of the power supply unit 200. The control system of the power supply unit 200 is configured in a digital circuit architecture. The detection signal and the control signal are each generated as a digital signal.

The output stage 210 includes a D/A converter 212 and a power amplifier 214. The output stage 210 converts the input digital control signal Vctrl into an analog control signal. The power amplifier 214 amplifies an analog control signal, and outputs the analog control signal thus amplified to the positive output OUTP.

The voltage detector 220 includes a voltage sense amplifier 222 and an A/D converter 224. The voltage sense amplifier 222 amplifies the voltage $V_i$ across the two outputs OUTPT and OUTN. The A/D converter 224 converts the output of the sense amplifier 222 into a digital voltage detection signal $V_{Si}$. The voltage detection signal $V_{Si}$ can be shared with the other channels via an interface circuit 280.

The voltage feedback signal generating unit 230 includes an adder/subtractor 232 and a divider 234. The adder/subtractor 232 adds the voltage detection signal $V_{Si}$ of the same channel and the voltage detection signals $V_{Si}$ of the other channels. The divider 234 divides the output of the adder/subtractor 232 by the number of channels N, so as to generate the voltage feedback signal Vfb based on the average value. The divider 234 can also be regarded as a coefficient circuit that multiplies the output of the adder/subtractor 232 by a coefficient 1/N.

The current detector 250 includes a sense resistor 252, a sense amplifier 254, and an A/D converter 256. The sense resistor 252 is provided on a path of the output current $I_{OUT}$ of the output stage 210. A voltage drop occurs across the sense resistor 252 in proportion to the output current $I_{OUT}$. The sense amplifier 254 amplifies the voltage drop across the sense resistor 252. The A/D converter 256 converts the output of the sense amplifier 254 into the digital current detection signal $Is_i$. The current target value Iref and the voltage limit value Vlim are input to the feedback controller 240.

The adder/subtractor 242 generates the difference (voltage error Verr) between the limit value Vlim and the voltage feedback signal Vfb. The adder/subtractor 246 generates the difference (current error Ierr) between the target value Iref and the current detection signal $Is_i$ (Ifb).

When Vfb<Vlim, the selector 248 selects the current error Ierr (constant current control). When Vfb>Vlim, the selector 248 selects the voltage error Verr (voltage clamp control).

A filter 244 generates the control signal Vctrl based on the output of the selector 248. The filter 244 may be configured of a Proportional Integral (PI) controller, a Proportional Integral Derivative (PID) controller, or the like. In constant current control, the control signal Vctrl level is adjusted by feedback control such that the current error Ierr approaches zero. In the voltage clamp control, the control signal Vctrl level is adjusted by feedback control such that the voltage error Verr approaches zero. The parameters of the filter 244 may be switched according to switching between the constant voltage control and the current clamp control.

The feedback controller 240 and the voltage feedback signal generating unit 230 may each be configured as a Central Processing Unit (CPU), Digital Signal Processor (DSP), Field Programmable Gate Array (FPGA), or the like.

The interface circuit 280 is capable of transmitting and receiving the voltage detection signal and the control signal Vctrl to and from the interface circuits 280 of the other channels.

Description has been made regarding the present disclosure with reference to the embodiments. The above-described embodiments have been described for exemplary purposes only. Rather, various modifications may be made by making various combinations of the aforementioned components or processes. Description will be made below regarding such modifications.

Description has been made with reference to FIG. 9 regarding the power supply unit 200 provided with a control system configured in a digital circuit architecture. However, the present invention is not restricted to such an arrangement. Also, the control system may be configured as an analog circuit.

Description has been made regarding the present disclosure based on the embodiments. The embodiments show only the mechanisms and applications of the present invention for exemplary purposes only and are by no means intended to be interpreted restrictively. Rather, various modifications and various changes in the layout can be made without departing from the spirit and scope of the present invention defined in appended claims.

What is claimed is:

1. A power supply apparatus comprising a plurality of channels of power supply units coupled in a stack connection,
    wherein the power supply units of the plurality of channels each comprise:
        a positive output and a negative output; and
        an output stage structured to generate an output voltage across the positive output and the negative output according to a control signal,
    wherein one of the plurality of channels is a master channel and the remaining ones are slave channels,
    the power supply unit of the master channel comprises:
        a current detector structured to generate a current detection signal that indicates an output current of the output stage; and
        a feedback controller structured to generate the control signal such that the current detection signal approaches a target value,
    and wherein the output stages of the master channel and all of the slave channels operate based on the control signal generated by the feedback controller of the master channel.

2. The power supply apparatus according to claim 1, wherein the plurality of channels of power supply units each further comprise a voltage detector structured to generate a voltage detection signal that indicates an output voltage of the output stage,
    wherein the power supply unit of the master channel further comprises a voltage feedback signal generating unit structured to receive the voltage detection signal from the power supply units of slave channels, which are the remaining channels of the plurality of channels, and to generate a voltage feedback signal based on the voltage detection signals of all the channels,
    and wherein, when the voltage feedback signal exceeds a predetermined limit value, the feedback controller of the master channel generates the control signal such that the voltage feedback signal approaches the predetermined limit value.

3. The power supply apparatus according to claim 1, wherein the power supply unit of the master channel further comprises a voltage detector structured to generate a voltage detection signal that indicates an output voltage of the output stage,
    and wherein, when the voltage detection signal exceeds a predetermined limit value, the feedback controller generates the control signal such that the voltage detection signal approaches the predetermined limit value.

4. The power supply apparatus according to claim 1, wherein the power supply units of the plurality of channels have the same configuration each comprising the feedback controller and the current detector,
    wherein each power supply unit is selectively switchable between a master mode and a slave mode,
    wherein, when a power supply unit is set to the master mode, the feedback controller is enabled,
    and wherein, when a power supply unit is set to the slave mode, the feedback controller is disabled.

5. The power supply apparatus according to claim 1, wherein the master channel is an uppermost-stage channel from among the plurality of channels.

6. A test apparatus provided with the power supply apparatus according to claim 1, structured to supply electric power to a device under test.

7. A power supply unit structured to allow a power supply apparatus to be formed by stacking a plurality of power supply units, the power supply units each comprising:
- a positive output and a negative output;
- an output stage structured to generate an output voltage across the positive output and the negative output according to a control signal;
- a current detector structured such that, when the power supply unit is set to a master channel, the current detector is activated so as to generate a current detection signal that indicates an output current of the output stage of the master channel, and when the power supply unit is set to a slave channel, the current detector is deactivated;
- a feedback controller structured such that, when the power supply unit is set to the master channel, the feedback controller is activated so as to generate the control signal such that the current detection signal approaches a target value; and
- an interface circuit structured such that, when the power supply unit is set to the master channel, the interface circuit transmits the control signal to the other channels, and such that, when the power supply unit is set to a slave channel, the interface circuit receives the control signal from the master channel,
- wherein the output stage is structured such that, when the power supply unit is set to a master channel, the output stage generates the output voltage according to the control signal generated by the feedback controller in the master channel, and such that, when the power supply unit is set to a slave channel, the output stage generates the output voltage according to only the control signal received by the interface circuit of the slave channel.

8. The power supply unit according to claim 7, further comprising a voltage detector structured to generate a voltage detection signal that indicates an output voltage of the output stage,
- wherein, when the power supply unit is set to the master channel, and when a voltage feedback signal based on the voltage detection signals of all the channels exceeds a predetermined limit value, the feedback controller generates the control signal such that the voltage feedback signal approaches the predetermined limit value.

9. The power supply unit according to claim 7, further comprising a voltage detector structured to generate a voltage detection signal that indicates an output voltage of the output stage;
- wherein, when the power supply unit is set to the master channel, and when the voltage detection signal exceeds a predetermined limit value, the feedback controller generates the control signal such that the voltage detection signal approaches the predetermined limit value.

10. A power supply apparatus structured by coupling in a stack connection a plurality of power supply units according to claim 6.

11. A test apparatus provided with the power supply apparatus according to claim 10, structured to supply electric power to a device under test.

* * * * *